(12) United States Patent
Kukulj et al.

(10) Patent No.: US 7,546,009 B2
(45) Date of Patent: Jun. 9, 2009

(54) PLANAR LENSES FOR INTEGRATED OPTICS

(75) Inventors: Dax Kukulj, Acton (AU); Benjamin Cornish, Palmerston (AU); Robert Bruce Charters, Palmerston (AU); Graham Roy Atkins, Kaleen (AU); Barry Luther-Davies, Kambah (AU)

(73) Assignee: RPO Pty Limited, Act (AU)

( * ) Notice: Subject to any disclaimer, the term of this patent is extended or adjusted under 35 U.S.C. 154(b) by 0 days.

(21) Appl. No.: 11/257,736

(22) Filed: Oct. 25, 2005

(65) Prior Publication Data

US 2006/0088244 A1  Apr. 27, 2006

Related U.S. Application Data

(60) Provisional application No. 60/622,186, filed on Oct. 25, 2004.

(51) Int. Cl.
*G02B 6/32* (2006.01)
*G02B 6/26* (2006.01)
*G02B 6/10* (2006.01)

(52) U.S. Cl. .............................. 385/33; 385/31; 385/34; 385/35; 385/129

(58) Field of Classification Search ............. 385/31–35; 65/387; 359/796
See application file for complete search history.

(56) References Cited

U.S. PATENT DOCUMENTS

| | | | |
|---|---|---|---|
| 3,976,364 A | | 8/1976 | Lindemann et al. |
| 4,119,362 A | | 10/1978 | Holzman |
| 5,914,709 A | * | 6/1999 | Graham et al. .............. 345/179 |
| 6,181,842 B1 | | 1/2001 | Francis et al. |
| 6,351,260 B1 | | 2/2002 | Graham et al. |
| 6,594,430 B1 | * | 7/2003 | Rausch et al. ............... 385/129 |
| 6,800,724 B2 | | 10/2004 | Zha et al. |

(Continued)

FOREIGN PATENT DOCUMENTS

EP    0058707    5/1984

(Continued)

OTHER PUBLICATIONS

PCT International Search Report, dated Jan. 13, 2006, 5 pages.

(Continued)

*Primary Examiner*—Brian Healy
*Assistant Examiner*—Hung Lam
(74) *Attorney, Agent, or Firm*—Miller, Matthias & Hull

(57) ABSTRACT

Planar lenses for integrated optics applications, in particular for use in optical touch screen sensors are disclosed. The disclosed planar lenses include a slab waveguide and an optical waveguide, preferably formed in unitary fashion, wherein the slab waveguide has a curved end face to focus light into or out of the optical waveguide, and wherein at least one additional lens is included within the slab waveguide. In one aspect of this disclosure, the additional lens is a diverging lens. In a second aspect the additional lens is a converging lens. The additional lens may match the acceptance angle of the optical waveguide to the curved end face of the slab waveguide. Alternatively, it may improve the tolerance of the planar lens to design or assembly errors and/or temperature variations. Preferably, the planar lenses are composed of a photo-patternable polymer, and the additional lenses are composed of air.

12 Claims, 10 Drawing Sheets

U.S. PATENT DOCUMENTS

| | | |
|---|---|---|
| 6,818,721 B2 | 11/2004 | Zha et al. |
| 2003/0235047 A1 | 12/2003 | Choi et al. |
| 2004/0201579 A1 | 10/2004 | Graham |
| 2005/0089298 A1 | 4/2005 | Maxwell et al. |
| 2006/0008199 A1* | 1/2006 | Glebov et al. ............... 385/15 |

FOREIGN PATENT DOCUMENTS

| | | |
|---|---|---|
| EP | 0557713 | 9/1993 |
| GB | 221324 | 1/1990 |
| JP | 56078814 | 6/1981 |
| JP | 56078814 A2 * | 6/1981 |
| JP | 2003190571 | 3/2004 |

OTHER PUBLICATIONS

Australian Patent Office International-Type Search Report, dated Mar. 14, 2005, 3 pages.

* cited by examiner

PLANAR LENSES FOR INTEGRATED OPTICS

TECHNICAL FIELD

A composite lens is disclosed for transmitting a beam of light to or from an integrated optical waveguide. The disclosed lens has particular application in the transmission and reception of light beams across an optical touch screen sensor.

BACKGROUND TO THE RELATED ART

Any discussion of the related art throughout the specification should in no way be considered as an admission that such prior art is widely known or forms part of common general knowledge in the field.

U.S. Pat. Nos. 5,914,709, 6,181,842 and 6,351,260 describe an optical touch screen sensor in which integrated optical waveguides are used to launch an array of light beams across a screen, then collect them at the other side of the screen and conduct them to a position-sensitive detector. In the design for the "transmit side", an array of waveguides feeds into a row of lens elements that expand the guided light beams in the horizontal plane, then collimate them in the horizontal plane as they are launched across the screen face. Collimation in the vertical plane is achieved with an external lens (such as a cylindrical lens), however this vertical collimation is not particularly important for the purposes of this invention.

Ideally, each collimated beam in the horizontal plane should "fill" the lens with uniform power distribution, thereby producing essentially a sheet of light with arbitrarily narrow low intensity stripes corresponding to the intra-lens gaps. The waveguides are designed to be multimode, and the lens is simply designed such that the divergence angle $\theta$ of the highest order guided mode is sufficient to fill the lens (note that divergence angle increases with mode order). This "ideal" situation is illustrated in FIG. 1, which shows an array of "transmit side" lens elements 10 and associated waveguides 11. Each lens element 10 is a planar slab of dielectric material, with a curved face 12 at one end and the associated waveguide 11 at the other end. Preferably, lens element 10 and associated waveguide 11 are composed of the same material and fabricated in a unitary manner. For simplicity, waveguide 11 is preferably located symmetrically with respect to lens element 10, ie. is coincident with an axis of symmetry 13 of lens element 10. Ideally, light rays 14 from waveguide 11 enter lens element 10 at point 15 and diverge within a sector of angle $\theta$ to "fill" curved face 12, where they are refracted to form collimated output beam 16. Lens element 10 has two angled sidewalls 17 and two sidewalls 18 parallel to axis of symmetry 13, in addition to curved face 12 where refraction occurs. It will be appreciated by those skilled in the art that so long as the guided modes diverging within a lens element 10 do not encounter the sidewalls, their configuration is largely irrelevant.

In terms of waveguide structures, lens element 10 is essentially a slab waveguide in which light is confined in the out-of-plane direction, but free to diverge in-plane. In the optical path, one end of the slab waveguide is optically connected to waveguide 11, while curved surface 12 forms the other end.

The reverse process occurs on the "receive side", which has lens elements that are mirror images of "transmit side" lens elements 10.

Referring to FIG. 2, one problem that has been encountered with the prior art design is that the collimated beams may not in fact "fill" curved faces 12 of lens elements 10, but instead form discrete beams 20 separated by considerable dark regions 21. This may occur because the actual divergence angle of the light within each lens element 10 ($\phi$) is much smaller than the expected divergence angle ($\theta$). In one configuration, for example, whilst $\theta$ is approximately 34°, $\phi$ is typically in the range of 10° to 16°. Without wishing to be bound by theory, it is believed that the waveguides are transmitting fewer modes than they are capable of supporting. Either the highest order modes are not being launched into the waveguides, or the highest order modes are being lost en route. Whatever the cause, the insufficient divergence causes problems in both the manufacture and performance of the touch screen. A manufacturing problem arises because when the transmitted light is in the form of discrete beams, the receive-side lens array needs to be critically aligned (in the horizontal plane) with the transmit-side lens array, so that each receive-side lens collects a discrete beam. If on the other hand the transmitted light is essentially a continuous sheet, the horizontal positioning of the receive-side lens array is non-critical. The performance problem is one of diminished spatial resolution. The detection algorithms of the touch screen sensor are capable of resolving grey scales, so that even a partial blockage of an individual beam can be detected and translated into positional information. However if the transmitted light is in the form of discrete beams, there are significant "dark" areas from which no blockage can be detected and therefore it is very difficult to interpolate with a grey scale algorithm. Additionally, the touch sensor cannot detect a touch event in the "dark" areas where there is no light transmitted. The advantages of having a continuous sheet (or "lamina") of light rather than discrete beams are also discussed in US patent application No. 2004/0201579 A1.

One obvious solution is to increase the length of each lens element 10 such that the actual divergence angle $\phi$ is sufficient to fill each curved face 12. However in the context of optical touch screens this is often undesirable owing to the physical constraints on the width of the transmit and receive arrays (since the waveguides turn through a right angle, lens length translates directly to array width and it is necessary to fit the waveguide array in a screen bezel). For example, a reduction in divergence angle from 34° to 10° increases the lens length by a factor of approximately 3.5 so that if the lens width is 0.85 mm, its length will increase from 1.4 mm to 4.9 mm which may be impractical for an optical touch screen application given the space constraints in the bezel region of many displays.

A second problem with the prior art lens design shown in FIG. 1 is that it is a high magnification system, ie. one in which the image distance is much greater than the object distance. Such systems are well known in the art to be extremely sensitive to errors in the layout, and in particular to errors in the object distance (in this case the distance between point 15 and curved face 12) and the refractive power of the lens (determined in this case by the radius of curvature of curved face 12 and the refractive index of the material from which lens element 10 is composed). It will be appreciated by those skilled in the art that the magnification of a lens may be positive or negative, depending on whether the image it forms is erect or inverted. For the purposes of this invention, the terms "high magnification", "low magnification" and the like should be interpreted as referring to the magnitude of the magnification.

It is therefore an object of the present invention to overcome or ameliorate at least one of the disadvantages of the prior art, or to provide a useful alternative. This invention is described from the point of view of the "transmit side" lenses, however it will be appreciated that since the "receive side" lenses are generally mirror images of the "transmit side" lenses, any inventive modifications to the design of the "transmit side" lenses will apply equally well to the "receive side" lenses.

SUMMARY OF THE DISCLOSURE

To this end, a first aspect of this disclosure provides an optical element comprising a planar lens and an optical waveguide, said planar lens comprising a slab waveguide formed from a first medium of first refractive index, with said optical waveguide connected to a first end of said slab waveguide and a curved surface forming a second end of said slab waveguide, wherein said slab waveguide contains a diverging lens formed from a second medium of second refractive index, different from said first refractive index.

Advantageously, this aspect of this disclosure enables the guided light passing through the optical element to expand/diverge at a greater angle, thereby providing a more uniform power distribution.

Preferably, said planar lens and said optical waveguide are formed as a unitary body.

Preferably, said planar lens is a converging lens.

Preferably, said first medium is an optically transparent glass or polymer material.

In a first embodiment, said second refractive index is lower than said first refractive index. More preferably, said second medium is air. More preferably, said diverging lens is bi-convex, piano-convex or meniscus convex in shape.

In a second embodiment, said second refractive index is greater than said first refractive index. More preferably, said diverging lens is bi-concave, piano-concave or meniscus concave in shape.

A second aspect of this disclosure provides an optical element comprising a planar lens and an optical waveguide, said planar lens comprising a slab waveguide formed from a first medium of first refractive index, with said optical waveguide connected to a first end of said slab waveguide and a curved surface forming a second end of said slab waveguide, wherein said slab waveguide contains at least one converging lens formed from a second medium of second refractive index, different from said first refractive index.

Advantageously, this aspect is directed to improving the tolerances of an optical element incorporating a planar lens to design and/or assembly errors and variations in ambient temperature.

Preferably, said planar lens and said optical waveguide are formed as a unitary body.

Preferably, said planar lens is a converging lens.

Preferably, said first medium is an optically transparent glass or polymer material.

In a first embodiment, said second refractive index is lower than said first refractive index. More preferably, said second medium is air. More preferably, said converging lens is bi-concave, piano-concave or meniscus concave in shape.

In a second embodiment, said second refractive index is greater than said first refractive index. More preferably, said converging lens is bi-convex, plano-convex or meniscus convex in shape.

A third aspect of this disclosure provides an optical touch screen sensor including a plurality of transmit optical elements and a plurality of receive optical elements, wherein:

each transmit optical element and each receive optical element comprises a planar lens and an optical waveguide, said planar lens comprising a slab waveguide formed from a first medium of first refractive index, with said optical waveguide connected to a first end of said slab waveguide and a curved surface forming a second end of said slab waveguide, wherein said slab waveguide contains a diverging lens formed from a second medium of second refractive index, different from said first refractive index.

Preferably, said planar lens and said optical waveguide are formed as a unitary body.

Preferably, said planar lens is a converging lens.

Preferably, said first medium is an optically transparent glass or polymer material.

In a first embodiment, said second refractive index is lower than said first refractive index. More preferably, said second medium is air. More preferably, said diverging lens is bi-convex, plano-convex or meniscus convex in shape.

In a second embodiment, said second refractive index is greater than said first refractive index. More preferably, said diverging lens is bi-concave, piano-concave or meniscus concave in shape.

A fourth aspect of the present invention provides an optical touch screen sensor including a plurality of transmit optical elements and a plurality of receive optical elements, wherein:

each transmit optical element and each receive optical element comprises a planar lens and an optical waveguide, said planar lens comprising a slab waveguide formed from a first medium of first refractive index, with said optical waveguide connected to a first end of said slab waveguide and a curved surface forming a second end of said slab waveguide, wherein said slab waveguide contains at least one converging lens formed from a second medium of second refractive index, different from said first refractive index.

Preferably, said planar lens and said optical waveguide are formed as a unitary body.

Preferably, said planar lens is a converging lens.

Preferably, said first medium is an optically transparent glass or polymer material.

In a first embodiment, said second refractive index is lower than said first refractive index. More preferably, said second medium is air. More preferably, said converging lens is bi-concave, piano-concave or meniscus concave in shape.

In a second embodiment, said second refractive index is greater than said first refractive index. More preferably, said converging lens is bi-convex, plano-convex or meniscus convex in shape.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

BRIEF DESCRIPTION OF DRAWINGS

The disclosed embodiments will now be described, by way of example only, with reference to the accompanying drawings in which.

DETAILED DESCRIPTION OF THE PRESENTLY PREFERRED EMBODIMENTS

Figure 1:
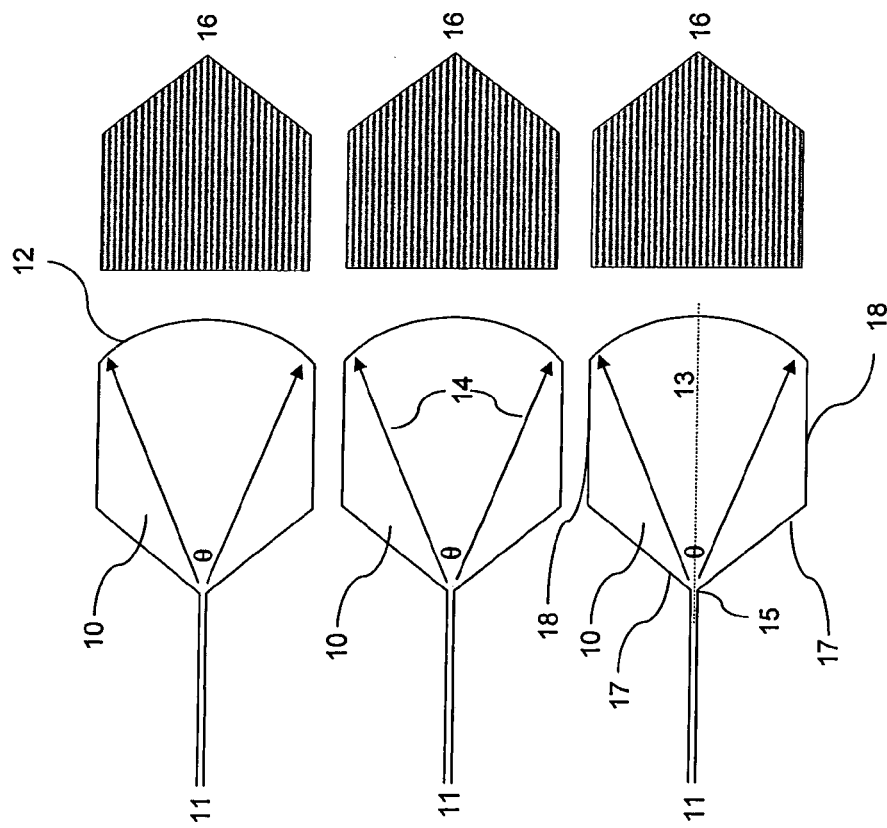
FIG. 1 is a schematic plan view depicting an "ideal" situation of beams of light being transmitted from an array of lenses (receiving light from a corresponding array of integrated optical waveguides), wherein collimated beams of light are transmitted from the entire width of each lens.
Figure 2:
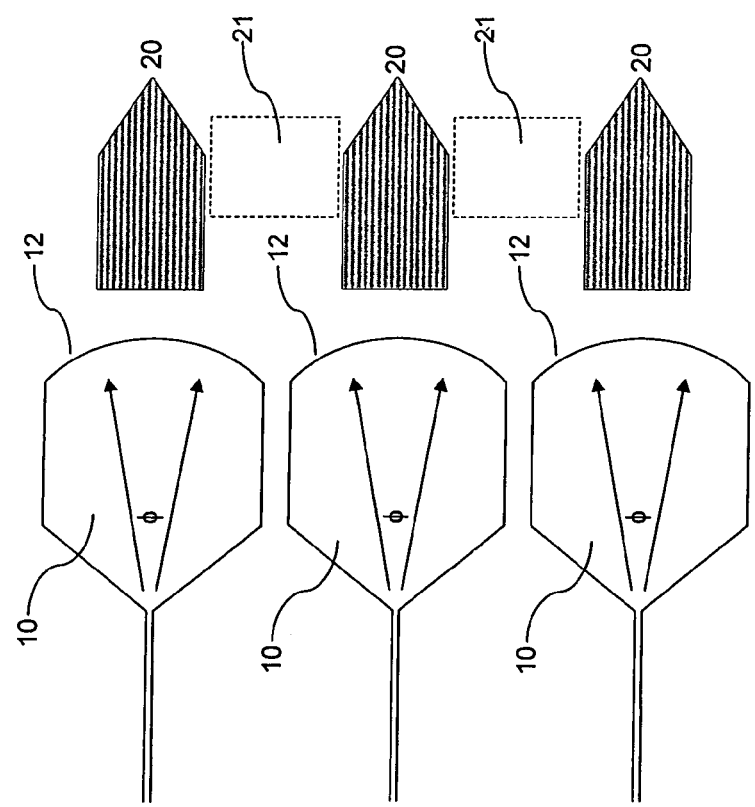
FIG. 2 is a schematic plan view depicting a situation where the beams of light being transmitted from an array of lenses (receiving light from a corresponding array of integrated optical waveguides) have insufficient divergence to fill each lens.

One problem with the prior art lens design as shown in FIG. 1 is that the collimated beams 16 may not in fact "fill" the curved faces 12 of lens elements 10, but instead form discrete beams 20 separated by considerable "dark" regions 21, as shown in FIG. 2. A second problem with the prior art lens design is that it is extremely sensitive to errors in the layout, and in particular to errors in the object distance (the distance between point 15 and curved face 12) and the refractive power of the lens (determined by the radius of curvature of curved face 12 and the refractive index of the material from which lens element 10 is composed). Both of these problems may be addressed individually by inserting one or more additional lenses within the body of lens element 10, thereby forming a composite lens. For ease of fabrication, these additional lenses are preferably composed of air, although they may be composed of any other material with a refractive index different to that of the material of which lens element 10 is composed.

Since lens element 10 is essentially a slab waveguide, the composite lenses of the present invention comprise a planar lens within a slab waveguide. Optical devices with planar lenses comprised of air or some other material and enclosed within slab waveguides are in fact known in the art. In one example, Japanese Patent Application No. JP5678814A discloses both converging and diverging air lenses, enclosed within polymer slab waveguides, for coupling light into or out of optical fibres connected to the slab waveguides. In another example, U.S. Pat. No. 5,253,319 discloses slab waveguides containing converging lenses comprising air or some other material, for distributing optical power between a plurality of input and output optical fibres. In yet another example, Chang et al. (IEEE Photonics Technology Letters vol. 15, pp. 1378-1380, 2003) disclose a planar beam expander comprising a slab waveguide with one diverging lens and one converging lens in series. However in all these instances of the prior art, the slab waveguide itself does not comprise a lens. For example, in JP5678814A, the end face of the slab waveguide remote from the optical fibre is flat, not curved. This is to be contrasted with the composite lenses of the present invention, where the slab waveguide end face 12 remote from optical waveguide 11 is always curved, so that the slab waveguide itself comprises a lens.

Figure 3:
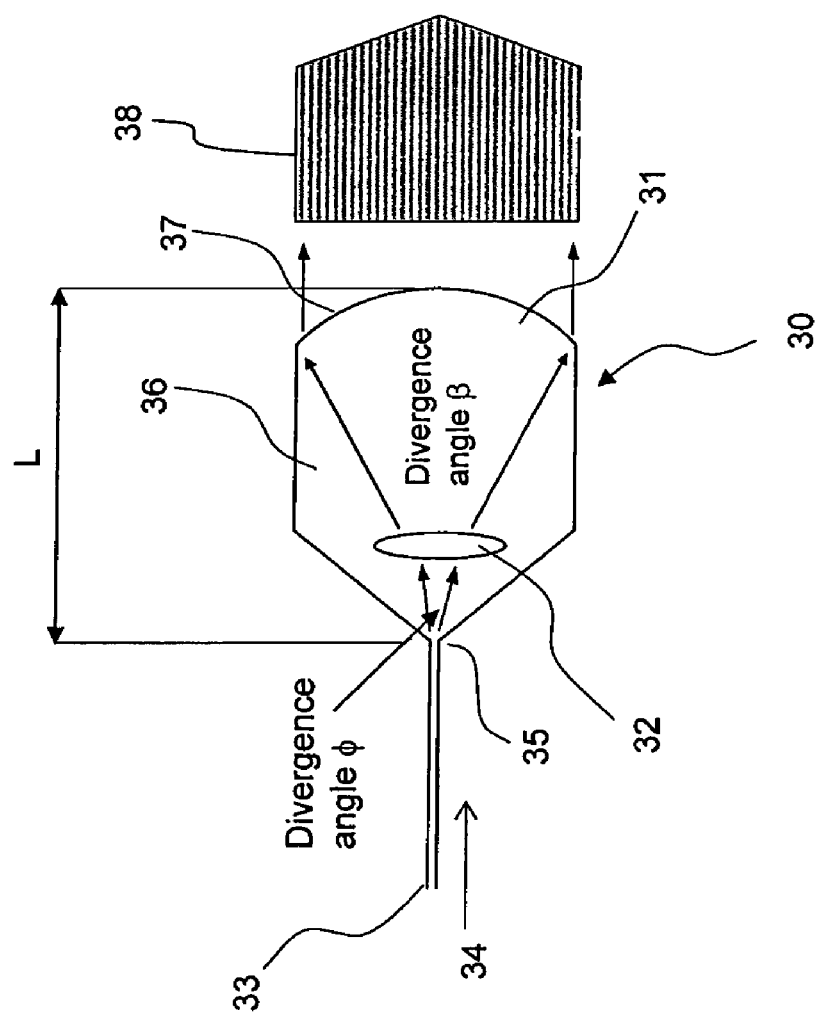
FIG. 3 is a schematic plan view of a composite lens in accordance with this disclosure.

According to the first aspect of the present invention, directed to the first problem, a diverging lens (also known in the art as a "negative" lens) is inserted into the body of a prior art lens element. Referring to FIG. 3, a composite lens 30 of length L comprising a diverging lens 32 followed by a converging lens 31 in accordance with the first aspect of this disclosure is illustrated. An integrated optical waveguide 33 transmits a beam of light in the direction of arrow 34, and connects to the body 36 of composite lens 30 at point 35. Body 36 of composite lens 30 is formed from a medium of refractive index greater than 1, and terminates with curved surface 37 that forms converging lens 31. Within body 36 of composite lens 30 is a region of different refractive index that forms diverging lens 32, located so as to encompass the divergence angle $\phi$ of light propagating from point 35, and serving to increase the divergence angle to a value $\beta$ so that the light now fills curved surface 37. Curved surface 37 collimates this light in the horizontal plane to produce beam 38. In the embodiment depicted, curved surface 37 comprises a portion of a circle, so that converging lens 31 is a planar spherical lens. However curved surface 37 can have any shape suitable for producing the required collimated beam. For example, rather than comprising a portion of a circle, it may comprise one or more portions of an ellipse, parabola or hyperbola, or any curve generated by a polynomial or any other equation. It may also comprise a plurality of straight segments that approximate one or more curved portions. In practice, the digitisation generally involved in fabricating the necessary mask for patterning a converging lens 31 means that curved surface 37 will be composed of a plurality of straight segments. Diverging lens 32 is shown as bi-convex in shape, and in this case is formed from a lower refractive index medium. It will be appreciated by those skilled in the art that a plano-convex or meniscus convex lens could also be used. Alternatively, diverging lens 32 may comprise a higher refractive index medium, in which case its shape may be bi-concave, plano-concave or meniscus concave. Whichever shape is chosen for diverging lens 32, its curved surface(s) may take any of the forms as described above for curved surface 37. It will be appreciated that both curved surface 37 and diverging lens 32 may have more complicated shapes. For example curved surface 37 may comprise two or more convex portions, each corresponding to convex or concave portions of the diverging lens.

It will be appreciated that for a given "fill factor" of curved surface 37, the addition of a diverging lens reduces the length of the composite lens. For the particular application of waveguide-based optical touch screens, this length reduction advantageously reduces the width of the screen bezel within which the waveguides and lenses are located.

In a preferred implementation of the first aspect of this disclosure, the body of composite lens 30 is formed from an optically transparent glass or polymer, while diverging lens 32 is composed of air (which has refractive index essentially equal to 1). An air lens is particularly preferred for ease of fabrication and because it offers a large refractive index contrast compared to body 36 of composite lens 30. However it should be noted that diverging lens 32 could be composed of some other material besides air, so long as there is sufficient contrast in refractive index between it and body 36. It will be appreciated by those skilled in the art that the specifics of the diverging lens design depend, for a given divergence angle, on the refractive indices of the two media.

If diverging lens 32 is composed of air, light rays traversing it will not be guided in the vertical (out-of-plane) direction, so that there will be some loss of light from out-of-plane divergence. It is therefore important to limit the path length through the diverging lens so this out-of-plane loss is not excessive. Out-of-plane divergence loss will be worst for those light rays that traverse the longest air gap, which for a diverging (and therefore convex) air lens will be in the central region. In this case, the loss may in fact be advantageous, since it will tend to reduce the intensity in the central region, thereby providing a more uniform intensity distribution across the lens structure. As disclosed in US 2004/0201579A1, a uniform intensity distribution is preferred for the particular application of an optical touch screen sensor. It will be appreciated that if diverging lens 32 is composed of a material of greater refractive index than body 36 of composite lens 30, then there will not be any out-of-plane loss of light traversing the diverging lens.

Figure 4A:
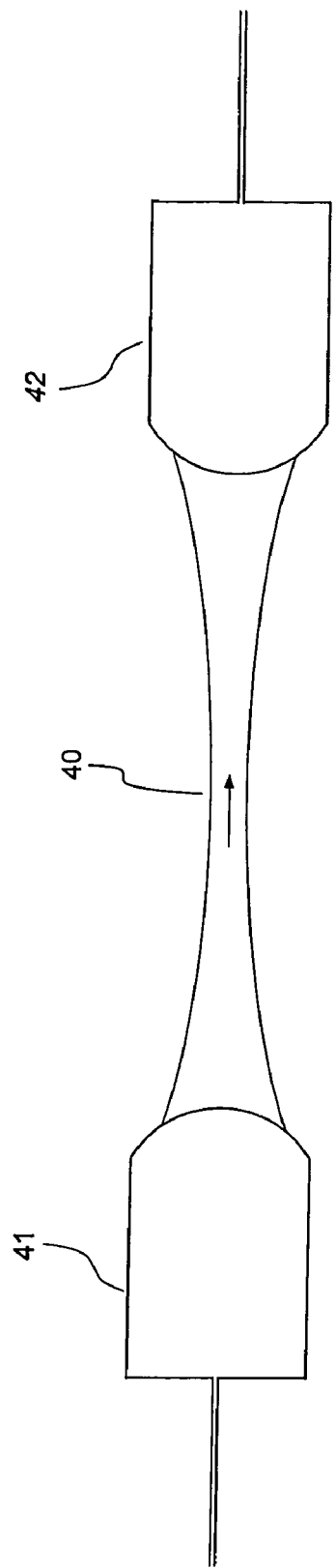
FIG. 4a shows a beam of light between a pair of transmit and receive lenses, using the Gaussian optics model.
Figure 4B:
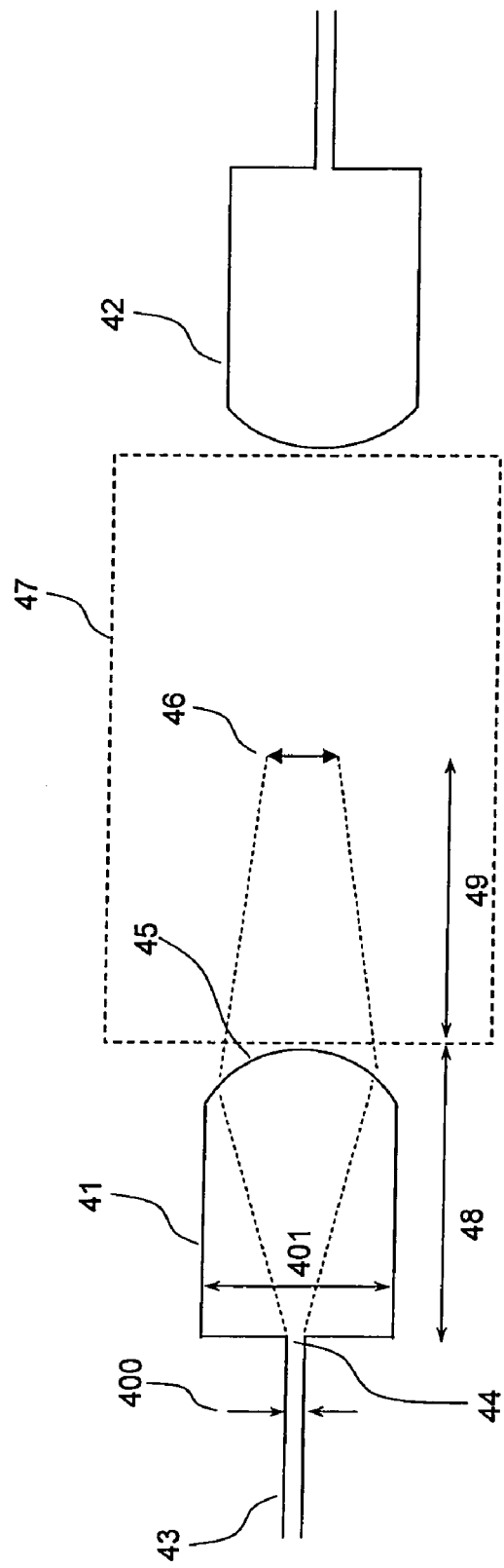
FIG. 4b shows a beam of light between a pair of transmit and receive lenses, using the geometrical optics model.

The second problem that can be addressed by a composite lens of the present invention will now be described in terms of geometrical optics (see for example the treatment in Chapter 5 of "Optics" by E. Hecht, $2^{nd}$ edn, Addison-Wesley, 1987). In FIG. 1, a "transmit side" lens element 10 of an optical touch screen sensor is shown to emit a collimated beam 16. This is in fact an idealisation, because diffraction tends to spread the emitted beam, preventing perfect collimation. In a more realistic picture, transmit side lenses should be designed such that each emitted beam is focussed to a beam waist at some point in the display area. As shown in FIG. 4a, the beam waist 40 is preferably located halfway between transmit lens element 41 and receive lens element 42, so that the two lens elements are of the same width. The geometrical optics picture is shown in FIG. 4b, where light emanating from transmit waveguide 43 at point 44 serves as an object of size $h_o$ (equal to the width 400 of transmit waveguide 43) that is refracted by curved surface 45 to form an image 46 of size $h_i$ midway across the display screen area 47. In this system, the (transverse) magnification is given by $M=h_i/h_o$. The magnification is also given by $M=-s_i/s_o$, where $s_o$ is the object distance 48 and $s_i$ is the image distance 49. Note that in the usual sign conventions for a simple converging lens producing a real image, $s_o$, $s_i$ and $h_o$ are all positive, while $h_i$ (and therefore M) is negative, ie. the image is inverted.

Figure 5:
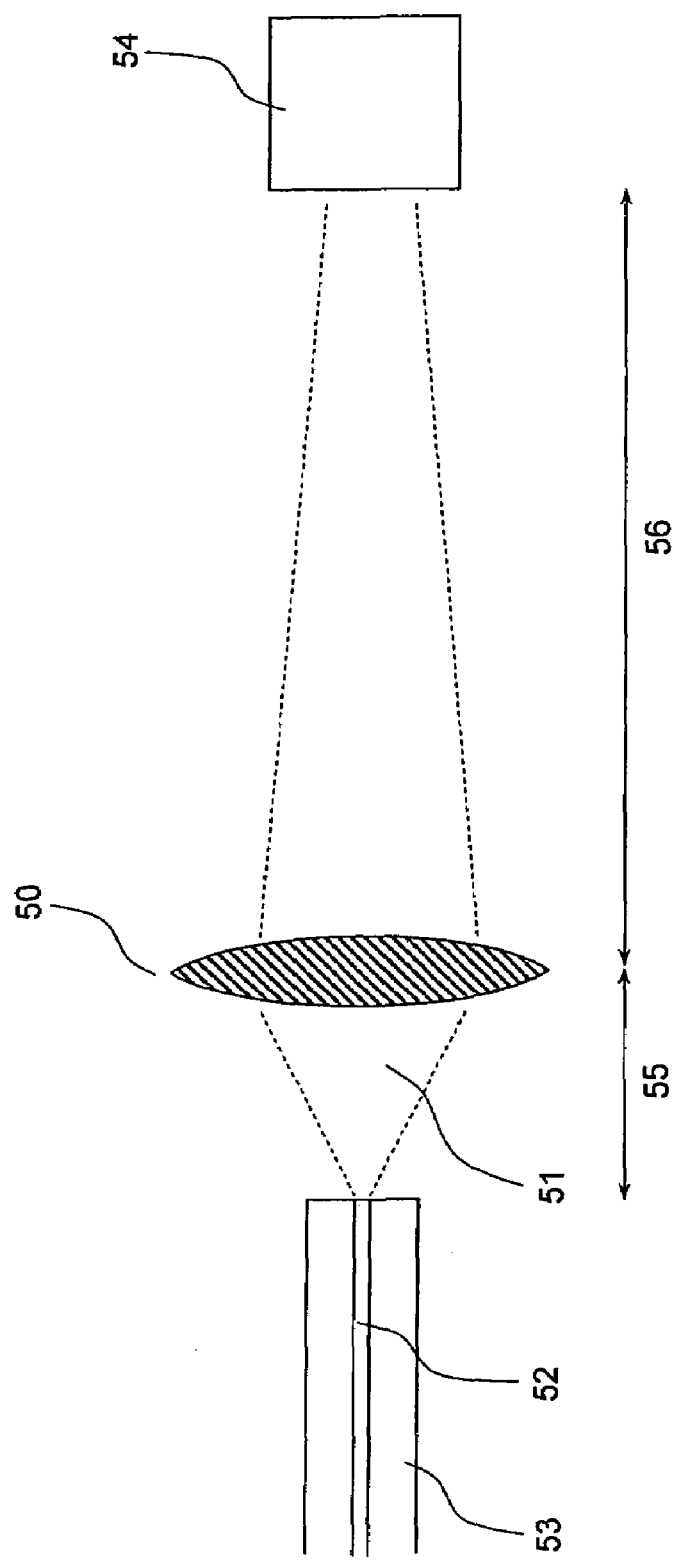
FIG. 5 shows a micro-optics assembly containing a high magnification lens.

For a typical waveguide-based optical touch screen, the length of the lens elements (ie. $s_o$) will be of order 2 mm and the width or height of the display area (ie. $2 \cdot s_i$) will be of order 60 mm, so that the magnification M will be of order −15. This is a high magnification for a single lens system, and it is well known in the art that such high magnification systems are extremely sensitive to errors in the layout. This sort of problem is frequently encountered in the field of micro-optics, where one or more lenses and other optical components need to be combined with a high degree of spatial precision. As an example of a micro-optics analogue to the transmit element of FIG. 4b, FIG. 5 shows a lens 50 focusing light 51 emanating from the core 52 of an optical fibre 53 onto a detector 54, where lens 50 is constrained to be much closer to optical fibre 53 than to detector 54. Because object distance 55 is much smaller than image distance 56, this represents a high magnification system, and it will be appreciated by those skilled in the art of micro-optics that small errors in the placement of lens 50 or its design (e.g. the radii of curvature of its surfaces) will cause large errors in the size and position of the image. Further, if lens 50 is composed of a material with a large thermo-optic coefficient (ie. the rate of change of refractive index with temperature), then temperature changes will also significantly affect its imaging power. In particular, polymers are known to have much higher thermo-optic coefficients (typically −1 to −4×10$^{-4}$/° C.) than, say, silicate glasses (of order +1×10$^{-5}$/° C.).

In the case of the transmit element shown in FIG. 4b, the image distance $s_i$ (and equivalently the image size $h_i$) will be extremely sensitive to errors in the length of transmit lens element 41 (ie. the object distance $s_o$) and the refractive power of transmit lens element 41 (determined by the radius of curvature of curved surface 45 and the refractive index of the material from which lens element 41 is composed). If the image is formed at the incorrect position (ie. not at the midpoint of the display screen area 47), then the light will not be correctly collected by receive lens element 42, and may even be collected by adjacent lens elements, causing spurious signals.

Figure 6:
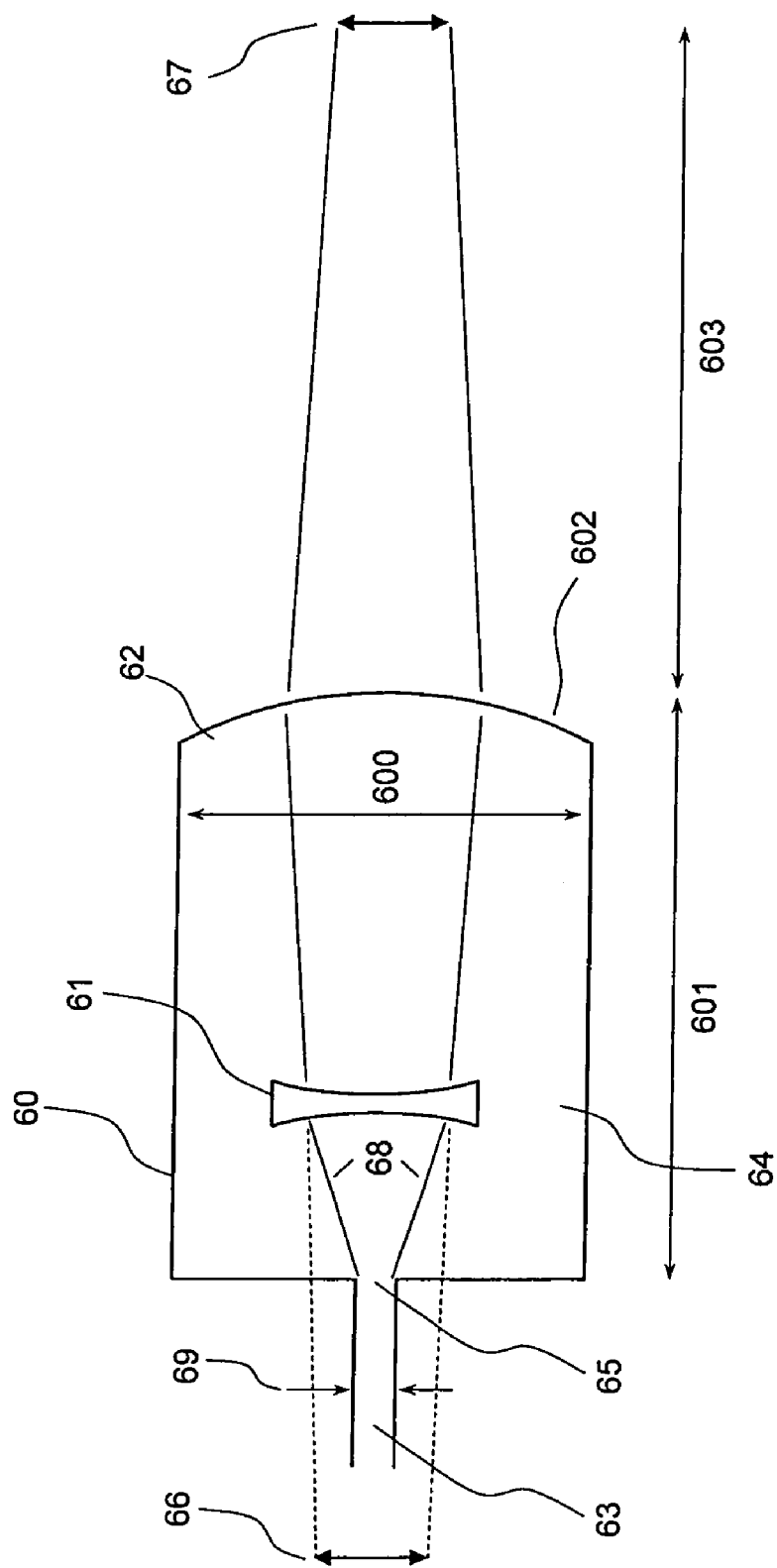
FIG. 6 is a schematic plan view of a composite lens in accordance with this disclosure.

According to the second aspect of the present invention, directed to the second problem, a converging lens is introduced into the body of lens element 10. Referring to FIG. 6, a composite lens element 60 comprising a first converging lens 61 and a second converging lens 62 in accordance with the second aspect of this disclosure is illustrated. In comparison with the simple lens element 41 shown in FIG. 4b, the single lens (ie. curved surface 45) with magnification M is replaced with two lower magnification converging lenses. As is well known in the field of micro-optics, such a configuration reduces the sensitivity of the lens system to design and/or assembly errors. If first converging lens 61 has magnification $M_1$ and second converging lens 62 has magnification $M_2$, and if $M_1 \cdot M_2 = M$, then composite lens element 60 and simple lens element 41 will have identical imaging performance (as measured by image distance $s_i$ and image height $h_i$). However it will be appreciated by those skilled in the art that composite lens element 60 will need to be made longer than simple lens element 41, if it is to have the same magnification.

In the geometrical optics view of composite lens element 60, the junction between waveguide 63 and body 64 of composite lens element 60 serves as the object 65 for first converging lens 61, with size $h_{o1}$ equal to width 69 of waveguide 63. First converging lens 61 is designed to project object 65 to form a virtual image 66 behind body 64, and second converging lens 62 is designed to project virtual image 66 to form real image 67, preferably located midway across the display area. The actual path of light through composite lens 60 is indicated by rays 68. As in the first aspect of this disclosure, first converging lens 61 has to be designed to encompass the divergence angle $\phi$ of light propagating from waveguide 63 into body 64. In this configuration, the magnification of the first converging lens is positive (it produces an erect, virtual image), whereas the magnification of the second converging lens is negative (it produces an inverted, real image).

Note that it is also possible to have a similar arrangement of two converging lenses 61 and 62 wherein first converging lens 61 forms a real image beyond the midpoint of the display area; this image then acts as a virtual object for second converging lens 62, which forms real image 67 located midway across the display area. However this arrangement is not advantageous, because first converging lens 61 would need to have a higher magnification than simple lens element 41, and would therefore be even more sensitive to design and/or assembly errors.

In a preferred implementation of the second aspect of this disclosure, body 64 of composite lens 60 is formed from an optically transparent glass or polymer, while first converging lens 61 is composed of air (which has refractive index essentially equal to 1). An air lens is particularly preferred for ease of fabrication and because it offers a large refractive index contrast compared to body 64 of composite lens 60. However it should be noted that first converging lens 61 could be composed of some other material besides air, so long as there is sufficient contrast in refractive index between it and body 64. As in the first aspect of this disclosure, it is important to limit the path length through the first converging lens so that out-of-plane divergence loss of light traversing it is not excessive.

The composite lens structures of the present invention can be advantageously fabricated from photo-patternable polymers using a photolithography/wet development process. Photo-patternable polymers are particularly preferred because of the ease and mild conditions (e.g. UV exposure followed by solvent development) by which they can be patterned.

One particularly suitable class of materials is UV curable siloxane polymers, synthesised for example by a condensation reaction as disclosed in U.S. Pat. No. 6,818,721 or U.S. Pat. No. 6,800,724. Siloxane polymers have excellent adhesion to a variety of substrate materials, including silicon, glass and plastics. A photoinitiator or thermal initiator may be added to increase the rate of curing. Examples of commercially available photoinitiators include 1-hydroxy-cyclohexyl-phenyl-ketone (Irgacure 184), 2-methyl-1[4-methylthio)phenyl]-2-morpholinopropan-1-one (Irgacure 907), 2,2-dimethoxy-1,2-diphenylethan-1-one (Irgacure 651), 2-benzyl-2-dimethylamino-1-(4-morpholinophenyl)-butanone-1 (Irgacure 369), 4-(dimethylamino)benzophenone, 2-hydroxy-2-methyl-1-phenyl-propan-1-one (Darocur 1173), benzophenone (Darocur BP), 1-[4-(2-hydroxyethoxy)-phenyl]-2-hydroxy-2-methyl-1-propane-1-one (Irgacure 2959), 4,4'-bis(diethylamino) benzophenone (DEAB), 2-chlorothioxanthone, 2-methylthioxanthone, 2-isopropylthioxanthone, benzoin and 4,4'-dimethoxybenzoin. For curing with visible light, the initiator may for example be camphorquinone. A mixture of two or more photoinitiators may also be used. For example, Irgacure 1000 is a mixture of 80% Darocur 1173 and 20% Irgacure 184. For thermal curing, organic peroxides in the form of peroxides (e.g. dibenzoyl peroxide), peroxydicarbonates, peresters (t-butyl perbenzoate), perketals, hydroperoxides, as well as AIBN (azobisisobutyronitrile), may be used as initiators.

Other additives, such as stabilisers, plasticisers, contrast enhancers, dyes or fillers may be added to enhance the properties of the polymer as required.

Fabrication of a composite lens structure according to the first aspect of this disclosure is described in the following two non-limiting examples, with reference to FIG. 3.

EXAMPLE 1

Following the procedure disclosed in U.S. Pat. No. 6,818,721, a lower refractive index polymer A was prepared with a viscosity of 2500 cP (at 20° C.) and a refractive index (measured at 20° C. on an Abbé refractometer with room light) of 1.483. A higher refractive index polymer B was prepared with a viscosity of 2200 cP (at 20° C.) and a refractive index of 1.509 (at 20° C.). A suitable photoinitiator was added to both polymer A and polymer B.

Polymer A was spin coated onto a silicon wafer and cured with UV light from a mercury lamp, to form a lower cladding layer 20 μm thick and with a refractive index of 1.492 (at 20° C. and 850 nm). Polymer B was spin coated onto the lower cladding to form a core layer 11 μm thick, and patterned with UV light through a mask; the unexposed polymer B material was then dissolved in isopropanol to form a waveguide 33 and composite lens 30 comprising a diverging lens 32 composed of air, followed by a converging lens 31. Exposed polymer B material had a refractive index of 1.519 (at 20° C. and 850 nm). Finally, a protective upper cladding layer can optionally be deposited by spin coating and UV curing a second layer of polymer A. Note that it is necessary to pattern this upper cladding layer, in the same manner as for the polymer B layer, not only to avoid covering and disrupting the curved focussing surface 37 of converging lens 31 (as disclosed in U.S. Pat. No. 7,218,812), but also to avoid in-filling the diverging air lens with cured polymer A material. Although the diverging air lens is filled temporarily with uncured polymer A, this material is removed in the subsequent isopropanol development step. The point at which the patterned top cladding ends is not particularly important, so long as the diverging air lens remains uncovered. It may for example be patterned so as to end at or near point 35, so that waveguide 33, which in practice is some two orders of magnitude longer than composite lens 30, remains mechanically protected.

It will be appreciated that if the diverging lens 32 is composed of air, it can be added to the existing converging lens 31 without any additional process steps. It requires nothing more than a modification of the mask design, and is therefore preferred for ease of fabrication. It would be possible however, at the expense of additional process steps, to fill the diverging lens region with some other curable polymer C, with refractive index significantly different from polymer B, either before or after the (optional) upper cladding layer is deposited and patterned. Of course the diverging lens region could be filled with upper cladding polymer A, but since (for waveguiding purposes) its refractive index is usually only slightly lower than that of polymer B, the refractive power of the diverging lens would be severely limited.

EXAMPLE 2

Figure 7B:
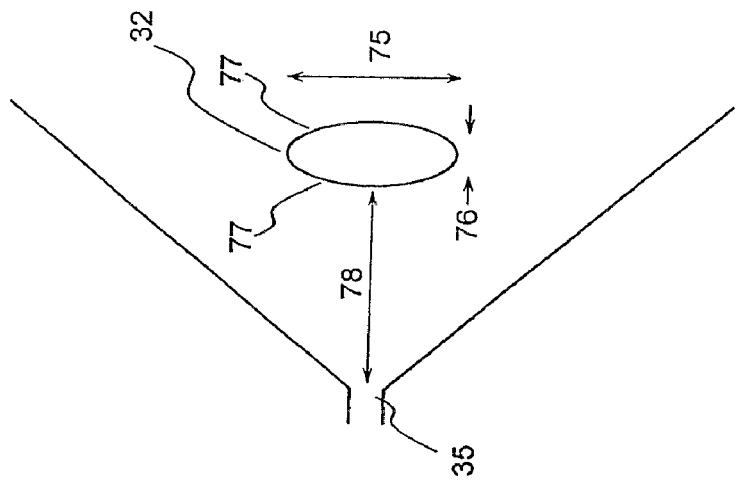
FIG. 7b illustrates the dimensions of a diverging air lens and its positioning within a converging lens, to form a composite lens in accordance with this disclosure.
Figure 7A:
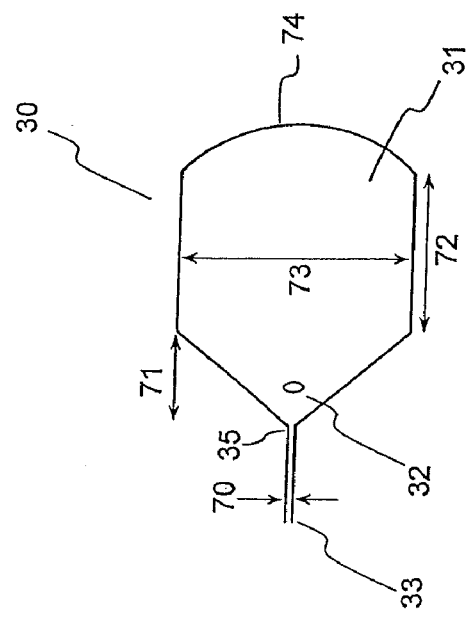
FIG. 7a illustrates the dimensions of a composite lens in accordance with this disclosure.
Figure 8:
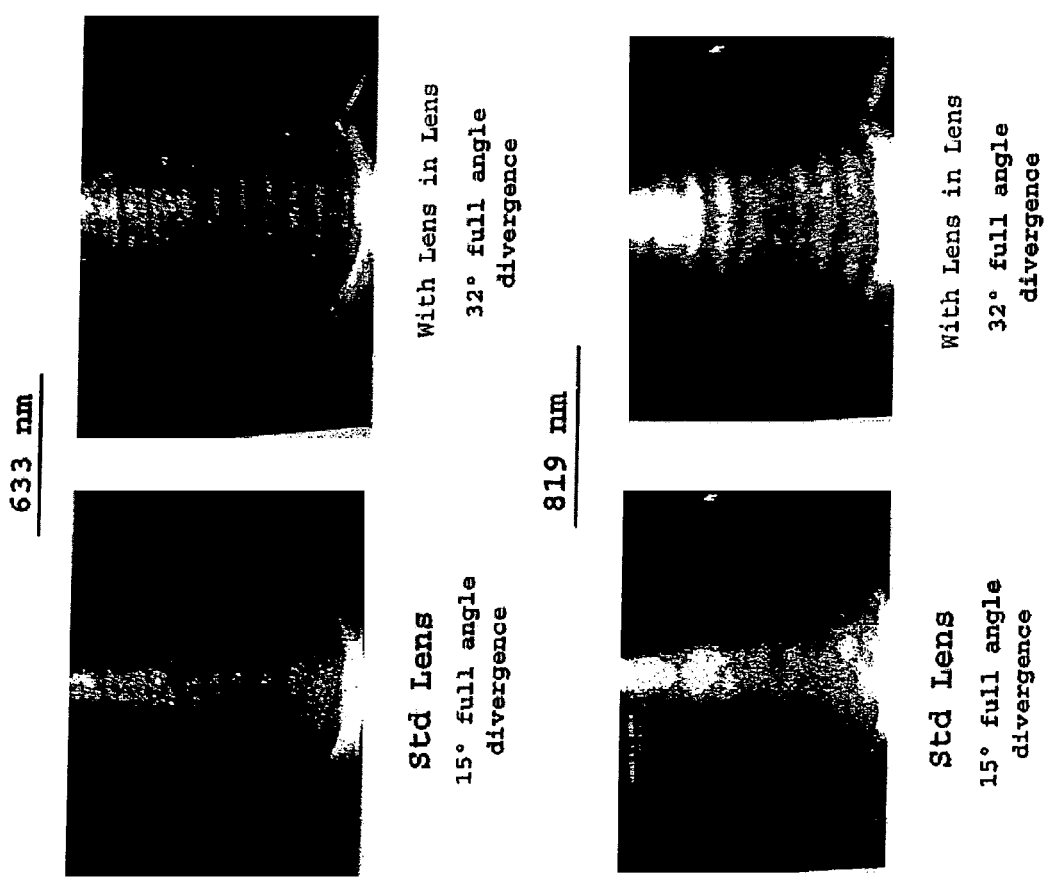
FIG. 8 illustrates the performance of a composite lens in accordance with this disclosure, compared to the performance of a prior art lens.

With reference to FIG. 7a and FIG. 7b, the dimensions of an example composite lens 30 according to the first aspect of the present invention, fabricated via the procedure described in Example 1 and comprising a diverging lens 32 followed by a converging lens 31, will be described. With reference to FIG. 7a, the width 70 of waveguide 33 entering composite lens 30 at point 35 is 8 μm. Converging lens 31 has a flared section 71 of length 300 μm, a straight section 72 of length 1160 μm, a width 73 of 750 μm, and ends in a curved surface 74 that is an arc of a circle with radius of curvature 570 μm. With reference to FIG. 7b, diverging air lens 32 is a bi-convex structure with width 75 of 80 μm and length 76 of 16 μm, is composed of two circular arcs 77 of radius of curvature 100 μm and is positioned a distance 78 of 130 μm from point 35. In the geometrical optics picture, diverging lens 32 forms a virtual image between itself and point 35, and this virtual image serves as the object for converging lens 31 comprising curved surface 74. Assuming a single mode (ie. Gaussian TEM00) beam of wavelength 850 nm in a medium with refractive index of 1.519, the diverging air lens 32 of FIG. 7b would approximately double the divergence angle of light within composite lens 30. The results of this calculation were confirmed experimentally, by launching light from an optical fibre (Corning SMF28) into lens structures with and without an included diverging air lens of the above dimensions. The divergence of light at two wavelengths, 633 nm and 819 nm, within these lens structures was imaged with a CCD camera, as shown in FIG. 8. The photographs show that the included diverging lens approximately doubles the divergence angle, from 15° to 32°.

Certain advantageous composite lenses according to the second aspect of the present invention, as well as disadvantages of the simple lens element of the prior art, will now be described in the following three non-limiting examples.

COUNTER-EXAMPLE 1

A low refractive index polymer A and a high refractive index polymer B were prepared as in Example 1. To fabricate a simple transmit lens element 41 of the prior art, as shown in FIG. 4b, polymer A was spin coated onto a silicon wafer and cured with UV light from a mercury lamp, to form a lower cladding layer 20 µm thick and with a refractive index of 1.492 (at 20° C. and 850 nm). Polymer B was spin coated onto the lower cladding to form a core layer 11 µm thick, and patterned with UV light through a mask; the unexposed polymer B material was then dissolved in isopropanol to form waveguide 43 with width 400 of 8 µm and lens element 41 with width 401 of 0.75 mm and length 48 of 2.0 mm. Exposed polymer B material had a refractive index of 1.519 (at 20° C. and 850 nm). Lens element 41 ends in curved surface 45 that is an arc of a circle with radius of curvature 0.655 mm. Refraction at curved surface 45 (a single spherical interface) is governed by the following equation:

$$\frac{n_1}{s_o} + \frac{n_2}{s_i} = \frac{n_2 - n_1}{R} \quad (1)$$

wherein $n_1$ is the refractive index of the first medium (cured polymer B, taken to be 1.519), $n_2$ is the refractive index of the second medium (air, taken to be 1), R is the radius of curvature of curved surface 45 (−0.655 mm, negative in the usual sign convention), $s_o$ is the object distance (equal to length 48, 2.0 mm), and $s_i$ is the image distance 49. Straightforward rearrangement of equation (1) yields $s_i$=30 mm, so that the magnification (given by $M=-s_i/s_o$) is −15. Since waveguide 43 has width 400 of 8 µm (taken to be the object size $h_o$), the image size $h_i$ will be −120 µm (negative since the image is inverted).

From equation (1), it can be seen that the image distance $s_i$ will be affected by changes in $s_o$, R and $n_1$ ($n_2$, the refractive index of air, can be safely assumed to be constant). Considering firstly the geometrical parameters $s_o$ and R, Tables 1 and 2 show the effect on $s_i$ of small changes (±5, 10 and 15 µm) in $s_o$ and R, with all other parameters held constant. It can be seen that $s_i$ is highly sensitive to small perturbations in the design of lens element 41, and in particular to errors in R.

TABLE 1

Variation in image distance $s_i$ with object distance $s_o$ for nominally 2 mm long simple transmit element with magnification of −15.

| $s_o$/mm | % change in $s_o$ | $s_i$/mm | % change in $s_i$ |
|---|---|---|---|
| 1.985 | −0.75 | 36.23 | +20.8 |
| 1.990 | −0.50 | 33.87 | +12.9 |
| 1.995 | −0.25 | 31.81 | +6.1 |
| 2.000 | 0 | 30.00 | 0 |
| 2.005 | +0.25 | 28.38 | −5.4 |
| 2.010 | +0.50 | 26.94 | −10.2 |
| 2.015 | +0.75 | 25.65 | −14.5 |

TABLE 2

Variation in image distance $s_i$ with radius of curvature of lens, for 2 mm long simple transmit element with magnification of −15.

| R/mm | % change in R | $s_i$/mm | % change in $s_i$ |
|---|---|---|---|
| −0.670 | +2.3 | 64.19 | +114.0 |
| −0.665 | +1.5 | 46.71 | +55.7 |
| −0.660 | +0.8 | 36.59 | +22.0 |
| −0.655 | 0 | 30.00 | 0 |
| −0.650 | −0.8 | 25.35 | −15.5 |
| −0.645 | −1.5 | 21.91 | −27.0 |
| −0.640 | −2.3 | 19.26 | −35.8 |

Since lens element 41 is composed of a material with a large thermo-optic coefficient ($dn_1/dT=-2.8\times10^{-4}$ for polymer B), it will also be sensitive to fluctuations around the design temperature of 20° C., as shown in Table 3.

TABLE 3

Variation in image distance $s_i$ with ambient temperature, for 2 mm long simple transmit element with magnification of −15.

| T/° C. | $n_1$ | % change in $n_1$ | $s_i$/mm | % change in $s_i$ |
|---|---|---|---|---|
| 5 | 1.5232 | +0.28 | 26.56 | −11.5 |
| 10 | 1.5218 | +0.18 | 27.61 | −7.9 |
| 15 | 1.5204 | +0.09 | 28.75 | −4.1 |
| 20 | 1.519 | 0 | 30.00 | 0 |
| 25 | 1.5176 | −0.09 | 31.35 | +4.5 |
| 30 | 1.5162 | −0.18 | 32.83 | +9.4 |
| 35 | 1.5148 | −0.28 | 34.46 | +14.9 |

In the present case, where lens element 41 is formed in a mask-based lithography process, the geometry of lens element 41 (essentially $s_o$ and R) can be defined with a high degree of precision (typically a few nm), so that, at a given temperature, the image distance $s_i$ will be essentially fixed. However for a consumer electronics device incorporating an optical touch screen, it is generally not economical to control the device temperature, so that the temperature sensitivity demonstrated in Table 3 may be a significant problem.

EXAMPLE 3

A low refractive index polymer A and a high refractive index polymer B were prepared as in Example 1. To fabricate a composite transmit lens element 60 according to the second aspect of the present invention, as shown in FIG. 6, polymer A was spin coated onto a silicon wafer and cured with UV light from a mercury lamp, to form a lower cladding layer 20 µm thick and with a refractive index of 1.492 (at 20° C. and 850 nm). Polymer B was spin coated onto the lower cladding to form a core layer 11 µm thick, and patterned with UV light through a mask; the unexposed polymer B material was then dissolved in isopropanol to form a waveguide 63 with width 69 of 8 µm and composite lens element 60 with width 600 of 0.75 mm and length 601 of 2.5 mm. Exposed polymer B material had a refractive index of 1.519 (at 20° C. and 850 nm). Body 64 of composite lens contains a first converging lens 61 composed of air, and ends with curved surface 602 that forms a second converging lens 62. In this Example, first converging lens 61 is a symmetric bi-concave lens with two surfaces with equal radii of curvature, $R_1$. Refraction at first converging lens 61 is governed by the following thin lens equation:

$$\frac{n_1}{s_{o1}} + \frac{n_1}{s_{i1}} = \frac{2(n_2 - n_1)}{R_1} \quad (2)$$

where $n_1$ is the refractive index of the first medium (cured polymer B, taken to be 1.519), $n_2$ is the refractive index of the second medium (air, taken to be 1), $s_{o1}$ is the object distance, and $s_{i1}$ is the image distance. Refraction at second converging lens 62 is governed by the following equation:

$$\frac{n_1}{s_{o2}} + \frac{n_2}{s_{i2}} = \frac{n_2 - n_1}{R_2} \quad (3)$$

where $n_1=1.519$, $n_2=1$, $R_2$ is the radius of curvature of curved surface 602, $s_{o2}$ is the object distance, and $s_{i2}$ is the image distance.

In this Example, composite lens 60 is designed to have the same overall magnification (M=−15) as the simple lens element 41 in Counter Example 1, with first converging lens 61 having magnification $M_1=+\sqrt{15} \sim 3.873$ (positive since its image is virtual and erect) and second converging lens 62 having magnification $M_2=-\sqrt{15} \sim -3.873$. This particular arrangement is designated a "50/50 composite lens". Furthermore, composite lens 60 is designed to have the same image distance 603 as the simple lens element 41 in Counter Example 1, ie. $s_{i2}=30$ mm, so that image 67 is formed at the same position and with the same size (120 μm). These restrictions, combined with an overall lens length 601 of 2.5 mm, are sufficient to fix the configuration of composite lens 60: first converging lens 61 is placed a distance 1.826 mm from point 65 (so that $s_{o1}=1.826$ mm) and has radius of curvature $R_1=-1.682$ mm, while curved surface 602 has radius of curvature $R_2=-2.262$ mm.

When considering the design tolerances of this composite lens, there are now four geometric parameters that can be varied ($s_{o1}$, overall length 601, $R_1$ and $R_2$), as well as refractive index $n_1$ via the ambient temperature. The sensitivities of $s_{i2}$ to these parameters in a 50/50 composite lens are given in Tables 4 to 8.

TABLE 4

Variation in image distance $s_{i2}$ with object distance of first lens, for a 2.5 mm long 50/50 composite transmit lens element with magnification of −15.

| $s_{o1}$/mm | % change in $s_{o1}$ | $s_{i2}$/mm | % change in $s_{i2}$ |
|---|---|---|---|
| 1.811 | −0.82 | 35.72 | +19.0 |
| 1.816 | −0.55 | 33.58 | +11.9 |
| 1.821 | −0.27 | 31.69 | +5.6 |
| 1.826 | 0 | 30.00 | 0 |
| 1.831 | +0.27 | 28.49 | −5.0 |
| 1.836 | +0.55 | 27.12 | −9.6 |
| 1.841 | +0.82 | 25.88 | −13.7 |

TABLE 5

Variation in image distance $s_{i2}$ with overall length of composite lens, for a nominally 2.5 mm long 50/50 composite transmit lens element with magnification of −15.

| Overall length/mm | % change in length | $s_{i2}$/mm | % change in $s_{i2}$ |
|---|---|---|---|
| 2.485 | −0.60 | 30.35 | +1.2 |
| 2.490 | −0.40 | 30.23 | +0.8 |
| 2.495 | −0.20 | 30.12 | +0.4 |
| 2.500 | 0 | 30.00 | 0 |
| 2.505 | +0.20 | 29.89 | −0.4 |
| 2.510 | +0.40 | 29.78 | −0.8 |
| 2.515 | +0.60 | 29.66 | −1.1 |

TABLE 6

Variation in image distance $s_{i2}$ with radius of curvature of first converging lens, for a 2.5 mm long 50/50 composite transmit lens element with magnification of −15.

| $R_1$/mm | % change in $R_1$ | $s_{i2}$/mm | % change in $s_{i2}$ |
|---|---|---|---|
| −1.697 | +0.89 | 34.73 | +15.8 |
| −1.692 | +0.59 | 33.01 | +10.0 |
| −1.687 | +0.30 | 31.44 | +4.8 |
| −1.682 | 0 | 30.00 | 0 |
| −1.677 | −0.30 | 28.68 | −4.4 |
| −1.672 | −0.59 | 27.46 | −8.5 |
| −1.667 | −0.89 | 26.34 | −12.2 |

TABLE 7

Variation in image distance $s_{i2}$ with radius of curvature of second converging lens, for a 2.5 mm long 50/50 composite transmit lens element with magnification of −15.

| $R_2$/mm | % change in $R_2$ | $s_{i2}$/mm | % change in $s_{i2}$ |
|---|---|---|---|
| −2.277 | +0.66 | 31.43 | +4.7 |
| −2.272 | +0.44 | 30.94 | +3.1 |
| −2.267 | +0.22 | 30.46 | +1.5 |
| −2.262 | 0 | 30.00 | 0 |
| −2.257 | −0.22 | 29.55 | −1.5 |
| −2.252 | −0.44 | 29.11 | −3.0 |
| −2.247 | −0.66 | 28.68 | −4.4 |

TABLE 8

Variation in image distance $s_{i2}$ with ambient temperature, for a 2.5 mm long 50/50 composite transmit lens element with magnification of −15.

| T/° C. | $n_1$ | % change in $n_1$ | $s_{i2}$/mm | % change in $s_{i2}$ |
|---|---|---|---|---|
| 5 | 1.5232 | +0.28 | 26.75 | −10.9 |
| 10 | 1.5218 | +0.18 | 27.75 | −7.5 |
| 15 | 1.5204 | +0.09 | 28.83 | −3.9 |
| 20 | 1.519 | 0 | 30.00 | 0 |
| 25 | 1.5176 | −0.09 | 31.27 | +4.2 |
| 30 | 1.5162 | −0.18 | 32.65 | +8.8 |
| 35 | 1.5148 | −0.28 | 34.15 | +13.8 |

Comparing Tables 4 and 5 with Table 1 of Counter-Example 1, which show the effects of slight errors in the lens positions, it can be seen that introducing the extra lens has only made a small improvement in the tolerances. On the other hand, comparison of Tables 6 and 7 with Table 2 of Counter-Example 1, which show the effects of slight errors in the curvatures of the lens surfaces, reveals that introducing the extra lens has made a large improvement in the tolerances, representing a significant advantage of the 50/50 composite transmit lens element over the simple transmit lens element of the prior art. Finally, comparing Table 8 with Table 3 of Counter-Example 1, which show the effects of temperature variations, it can be seen that introducing the extra lens has made a small improvement in the tolerance.

It will be appreciated that the inventive composite transmit lens element could be designed with some other "magnification splitting" between the first and second lenses besides 50/50, subject to the condition $M_1 \cdot M_2=-15$ so that the overall lens performance is retained. Composite lenses with different magnification splittings will have different tolerances to geometrical errors and temperature variations. For example, if the second lens is more difficult to fabricate or position accurately, it is advantageous to design the composite lens such that the first lens has higher magnification than the second lens.

EXAMPLE 4

As explained above, changes in ambient temperature will be an important variable affecting the performance of optical touch screen lens elements composed of a polymer and fabricated via high precision photolithography. This Example shows how a composite transmit lens element of the present invention can be designed with a significantly reduced temperature sensitivity compared to a simple transmit lens element of the prior art, while retaining the overall imaging performance (ie. magnification and image distance).

Figure 9:
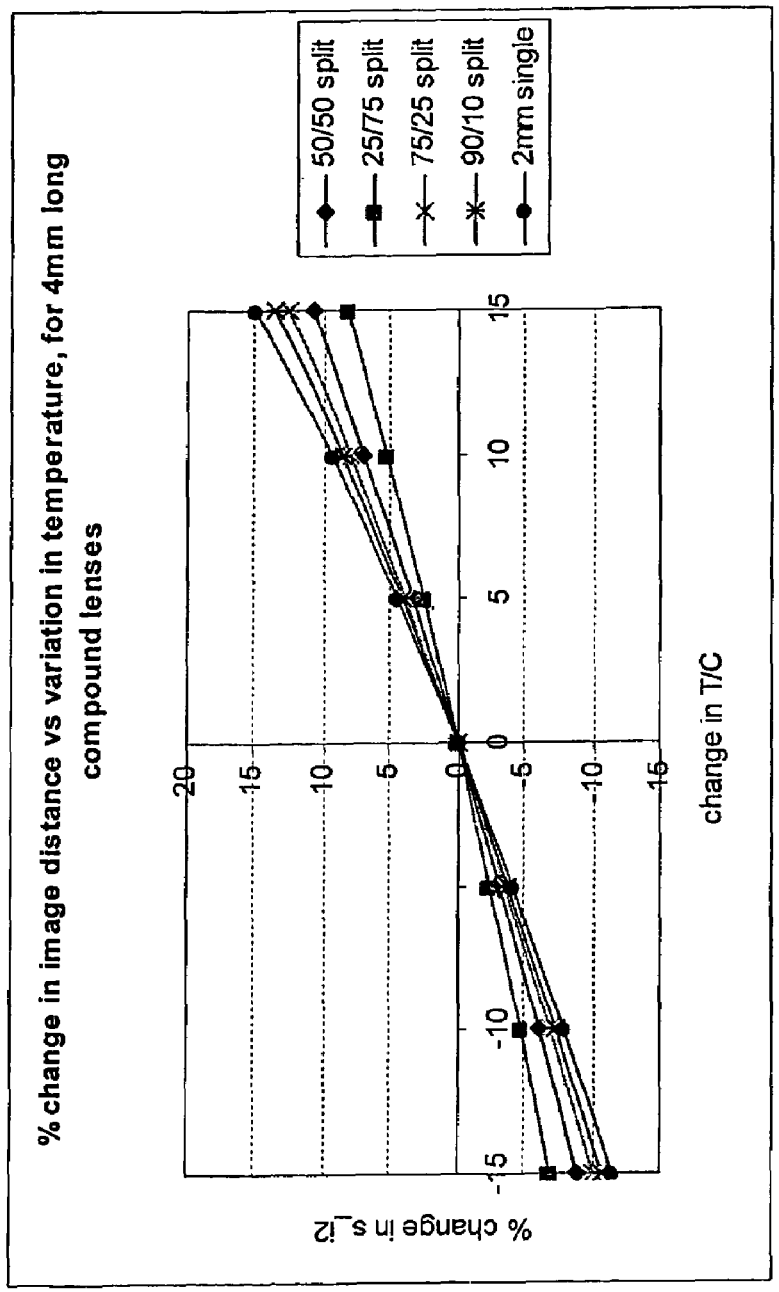
FIG. 9 is a graph illustrating the temperature sensitivity of various composite lenses in accordance with a second aspect of this disclosure, compared to the temperature sensitivity of a prior art lens.

As in Example 3, low refractive index polymer A and high refractive index polymer B were used to form a waveguide 63 with width 69 of 8 µm and composite lens element 60 with width 600 of 0.75 mm, and this time with length 601 of 4 mm. The sensitivity of $s_{i2}$ to ambient temperature for several composite transmit lens elements with different X/Y magnification splittings is shown in FIG. 9. The design parameters for these transmit lens elements are given in Table 9. Note that in each case the composite lens is designed to have an image distance $s_{i2}$ of 30 mm, and to have an overall magnification of −15; the individual magnifications of the first and second lenses are given by $M_1 = +\sqrt{(X \cdot 15/Y)}$ and $M_2 = -\sqrt{(Y \cdot 15/X)}$. For comparison, FIG. 9 also shows the temperature sensitivity of an equivalent 2 mm long simple transmit lens of the prior art. It can be seen that the temperature sensitivity can be significantly reduced by introducing an extra converging lens of relatively low magnification, at the expense of lengthening the lens element. Note that although a 4 mm long simple transmit lens element of the prior art would also have reduced temperature sensitivity, it would have a magnification of only −7.5. The advantage of using a composite lens is that the temperature sensitivity can be reduced without compromising the imaging power. With a composite lens configuration, the temperature sensitivity of a transmit lens could be still further reduced by extending the length of the lens, but obviously this is limited by other design constraints of the optical touch screen system, in particular the bezel width.

TABLE 9

Design parameters for 4 mm long composite transmit lens elements with magnification of −15.

| Magnification splitting of composite lens | $s_{o1}$/mm | Length/mm | $R_1$/mm | $R_2$/mm |
|---|---|---|---|---|
| 25/75 | 0.382 | 4 | −0.472 | −1.391 |
| 50/50 | 1.304 | 4 | −1.201 | −2.262 |
| 75/25 | 1.650 | 4 | −1.325 | −3.542 |
| 90/10 | 1.812 | 4 | −1.355 | −5.258 |

Although this disclosure has been described with reference to specific examples, it will be appreciated by those skilled in the art that the concepts of this disclosure may be embodied in many other forms.

Advantageously, the first aspect of the present invention is applicable to any situation where an in-plane lens is required to have a large divergence angle, while the second aspect of the present invention is applicable to any situation where an in-plane lens is required to have improved tolerances to design or assembly errors and/or variations in ambient temperature. One specific application of this disclosure is the optical touch screen sensor of the type described in U.S. Pat. Nos. 5,914,709, 6,181,842 and 6,351,260. In particular, the concepts of this disclosure described in terms of the transmit-side optics of an optical touch screen sensor, where the light beams are expanded and launched into free space. However the arguments apply equally well to the receive-side optics on the other side of the screen that collect portions of the sheet of light and funnel them into a waveguide array. More specifically, in the first aspect of this disclosure the curved front surface of a receive-side lens accepts a portion of the sheet of light and converges it within the body of the lens, and the included diverging lens adjusts the convergence angle to match the acceptance angle of the waveguide. If the diverging lens were not present a significant portion of the light may not be coupled into the waveguide. Conversely, a receive-side lens element according to the second aspect of this disclosure would have improved tolerances to design errors or ambient temperature changes.

The second aspect of the present invention has been described in terms of a composite transmit lens element in which an additional converging lens is inserted into the body of the transmit lens element of the prior art, comprising a single converging lens. In this embodiment, the two converging lenses of the composite transmit lens element in combination replace the single converging lens of the prior art transmit element in a manner that improves the tolerances to design or assembly errors and/or ambient temperature changes. It will be appreciated that the tolerances could be improved still further by the addition of two or more converging lenses within the body of the prior art transmit lens element.

The invention claimed is:

1. An optical element comprising a planar lens and an optical waveguide, said planar lens comprising a slab waveguide formed from a first medium of first refractive index, with said optical waveguide connected to a first end of said slab waveguide and a curved surface forming a second end of said slab waveguide, said slab waveguide containing a diverging lens formed from a second medium of second refractive index, different from said first refractive index, wherein said curved surface forms a converging lens such that as light passes from said optical waveguide through said slab waveguide its divergence is enhanced by said diverging lens before said light is converged by said curved surface so as to form a substantially collimated beam upon exiting said slab waveguide.

2. An optical element according to claim 1, wherein said planar lens and said optical waveguide are continuous and formed from the same material.

3. An optical element according to claim 1, wherein said first medium is an optically transparent glass or polymer material.

4. An optical element according to claim 1, wherein said second refractive index is lower than said first refractive index.

5. An optical element according to claim 4, wherein said second medium is air.

6. An optical element according to claim 4, wherein said diverging lens is bi-convex, plano-convex or meniscus convex in shape.

7. An optical touch screen sensor including at least one transmit optical element or at least one receive optical element, wherein:

said transmit optical element or said receive optical element comprises a planar lens and an optical waveguide, said planar lens comprising a slab waveguide formed from a first medium of first refractive index, with said optical waveguide connected to a first end of said slab waveguide and a curved surface forming a second end of said slab waveguide, wherein said slab waveguide contains a diverging lens formed from a second medium of second refractive index, different from said first refractive index, wherein said curved surface forms a converging lens such that as light passes from said optical waveguide through said slab waveguide its divergence is enhanced by said diverging lens before said light is converged by said curved surface so as to form a substantially collimated beam upon exiting said slab waveguide.

8. An optical touch screen sensor according to claim 7, wherein said planar lens and said optical waveguide are continuous and formed from the same material.

9. An optical touch screen sensor according to claim 7, wherein said first medium is an optically transparent glass or polymer material.

10. An optical touch screen sensor according to claim 7, wherein said second refractive index is lower than said first refractive index.

11. An optical touch screen sensor according to claim 10, wherein said second medium is air.

12. An optical touch screen sensor according to claim 10, wherein said diverging lens is bi-convex, plano-convex or meniscus convex in shape.

* * * * *